Patented Mar. 8, 1949

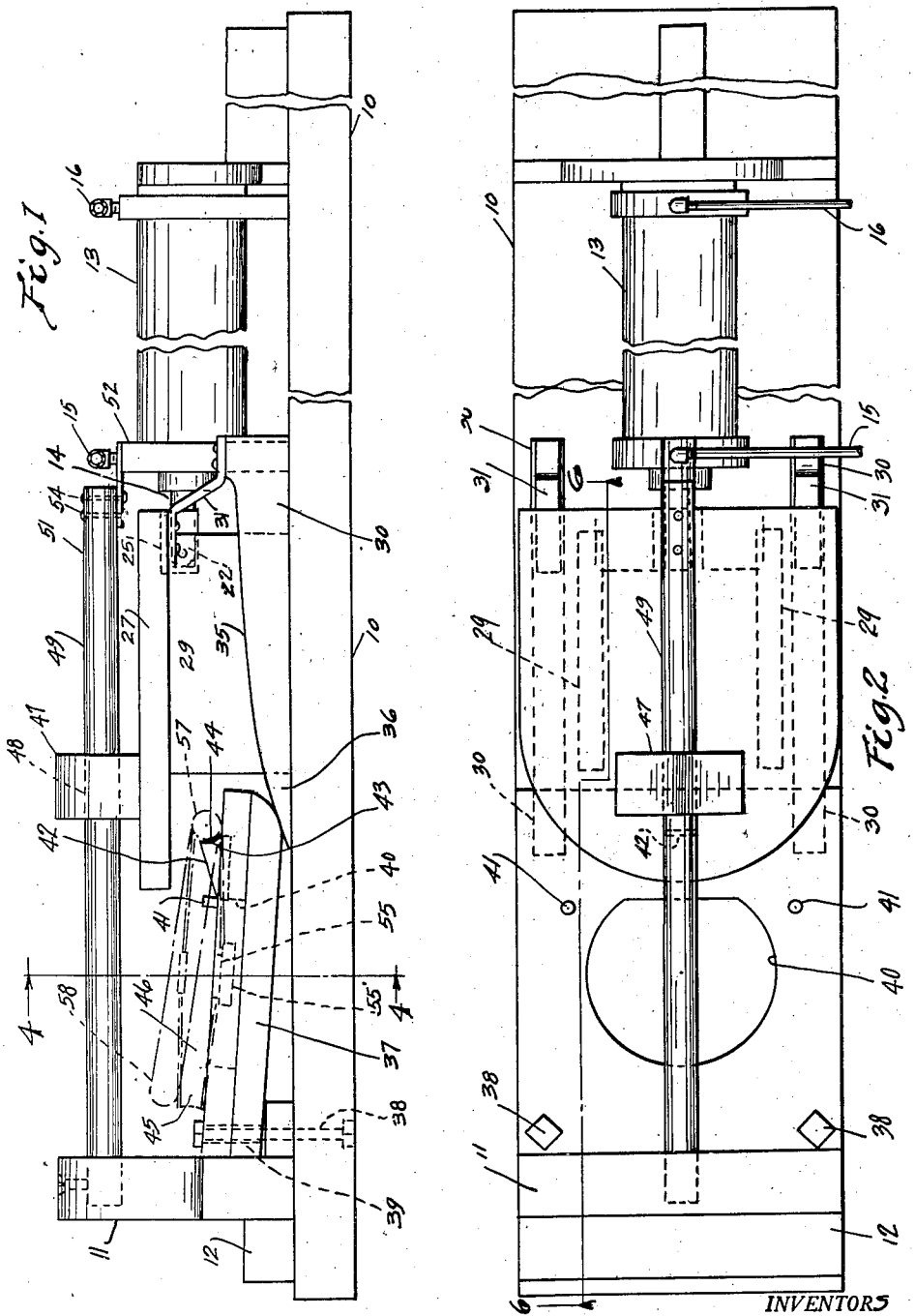

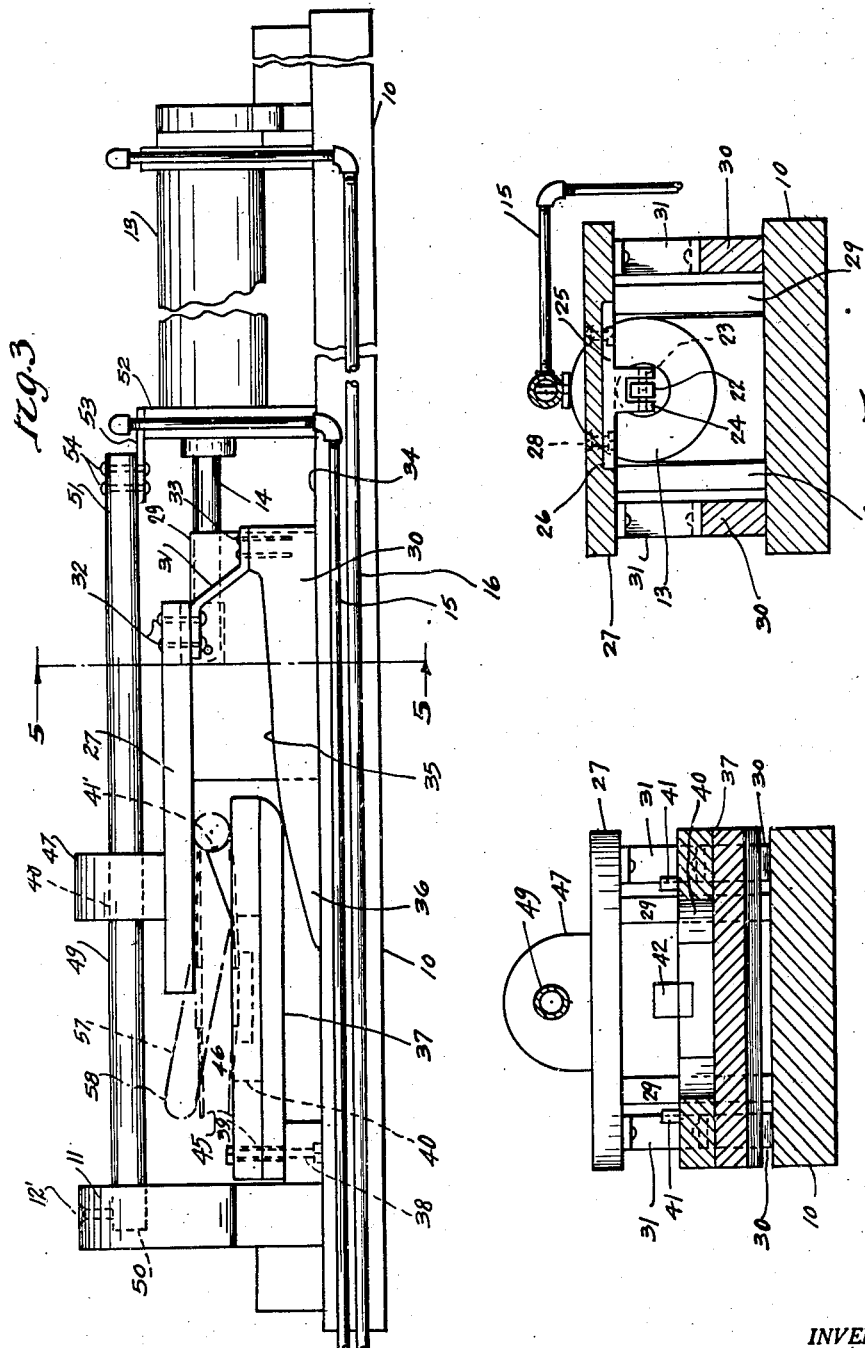

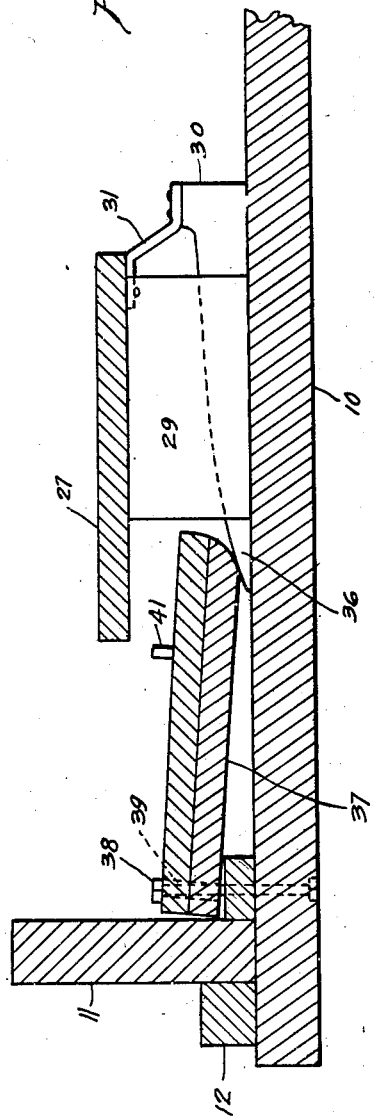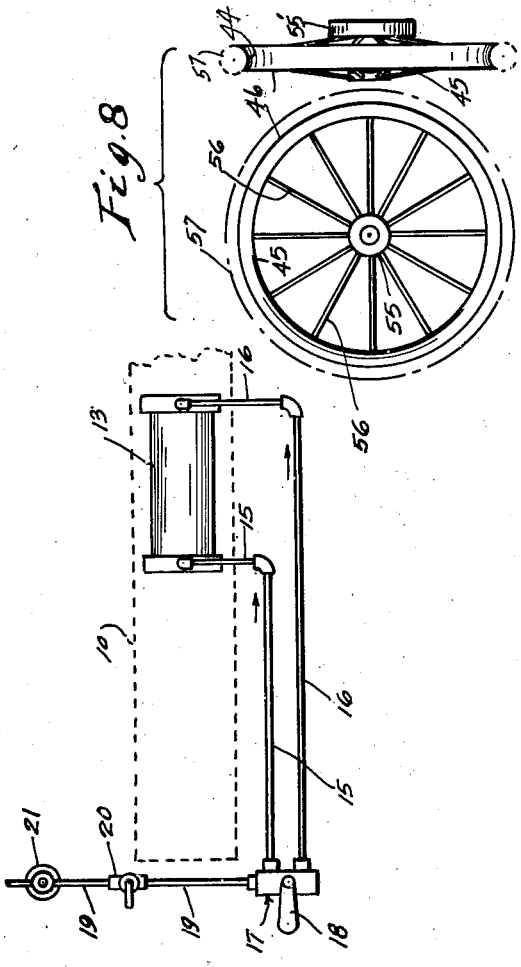

2,464,092

UNITED STATES PATENT OFFICE 2,464,092

MACHINE FOR FRICTIONALLY STRETCHING AND MOUNTING SOLID RESILIENT TIRES UPON RIMS

Samuel Kroll and Nathan J. Kroll, Chicago, Ill.

Application December 2, 1943, Serial No. 512,572

4 Claims. (Cl. 157—1.1)

Our invention relates to a machine for frictionally stretching and mounting solid resilient tires upon rims.

The invention has for its principal object the provision of an improved construction of this character which will be highly efficient in use and economical in manufacture.

A rubber tire bearing wheel generally consists of a hub with spokes leading therefrom and connected at their outer ends to what is commonly known as the rim or felly. On this felly is mounted the tire. If the tire be of a resilient material, such as rubber, the inside diameter of the tire is usually less than the outside diameter of the felly. The reason for this is that when the tire is mounted upon the felly, it will be resiliently held thereon. The present invention has among its salient objects the provision of a machine for mechanically mounting this tire upon the rim or felly of the wheel.

A further and equally important object of our invention is the provision of a tire mounting machine in which a pneumatic means for operating the machine for the purpose of mounting the tire upon the felly, includes a pneumatic system having an arrangement of valves whereby in order for the pneumatic means to function, it is necessary that the operator of the machine employ both hands to open the pneumatic system. In so doing, the operator's hands are out of the area whereby they otherwise may be injured.

A further and equally important object of the invention is the provision of a tire mounting machine which greatly increases the production of tire mounted wheels.

The invention also contemplates as an important object the provision of a simple and expeditious arrangement of parts for holding a wheel in place during the tire mounting operation.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a typical side elevational view of the machine embodying our invention;

Fig. 2 is a top plan view of the same;

Fig. 3 is a typical side elevational view of the machine similar to that shown in Fig. 1, showing the tire mounting pressure plate in a partially operated position upon the tire;

Fig. 4 is a sectional detail view taken substantially on line 4—4 of Fig. 1;

Fig. 5 is a sectional detail view taken substantially on line 5—5 of Fig. 3;

Fig. 6 is a fragmentary sectional detail view taken substantially on line 6—6 of Fig. 2;

Fig. 7 is a diagrammatical view of the pneumatic system employed in the machine and constituting a part of the invention; and Fig. 8 is a plan view of a typical wheel on which the tire is to be mounted.

The drawings illustrate our preferred form of construction by which the several objects of the invention may be accomplished.

In this connection, a base plate is indicated at 10. This base plate may be formed of any suitable material adaptable for the purpose.

Mounted at one end of the base plate is a vertical support 11 in the form of a block reinforced by a transversely extending strip 12. Mounted on the opposite end of the base plate 10 is a pneumatic cylinder 13 of any approved construction and design. This cylinder 13 has operated therein a piston (not shown) from which extends a shaft 14. Communicating with the cylinder 13 on the opposite sides of the piston are conduits 15 and 16 which supply compressed air to the cylinder. These conduits 15 and 16 have communication with a valve structure 17 of a standard construction, designed to admit air alternately through the conduits 15 and 16 to the cylinder and alternately to exhaust the air therefrom, whereby to operate the piston in opposite directions within the cylinder 13.

To this valve 17 a compressed air line 19 communicates. In this line 19 is a valve 20 of any approved type and adapted to be manually operated simultaneously with the operation of the valve handle 18 of the valve structure 17. In this line 19 is also provided an air pressure gauge 21 whereby air pressure through the line 19 may be regulated.

The arrangement is such that in order for the piston to operate under compressed air, it is necessary that the operator open both valve 17 and 20. Otherwise, the opening of either one of these valves alone will not allow the passage of air under pressure through the conduits 15 and 16. By this arrangement both hands of the operator are occupied during the operation of the piston and consequently the hands are disposed from the area with respect to the machine where they otherwise might be injured.

The piston has its outer end 22 connected as at 23 to a bifurcated portion 24 formed as a part of a bracket structure 25. This bracket structure is mounted in a recess portion 26 formed in a pressure plate 27, the pressure plate 27 in the present instance being in the form of a substantially rectangular flat plate.

The bracket 25 is connected to the pressure plate as at 28. This pressure plate is mounted to slide upon spaced vertically positioned supporting plates 29, the plates 29 being fixedly mounted in any suitable manner to the base plate 10. The pressure plate 27 is connected to spaced elevators 30 by means of brackets 31 secured to the pressure plate and the elevators, respectively, as at 32 and 33.

These elevators are slidably supported upon the top surface 34 of the base plate 10. The upper edges of each of these elevators are shaped to provide cam surfaces 35. These cam surfaces 35 engage the rounded portion 36 of a mounting plate 37. This plate 37 has loose connection to the base plate 10 by means of suitable connecting bolts 38 carried by the base plate 10 and projected up through enlarged openings 39 formed in the plate 37, whereby the plate is free to be elevated to a substantial horizontal position as shown in Fig. 3 by action of the elevators 30.

In the center of this plate 37 there is formed a substantially circular recess 40. Mounted upon this plate 37 in spaced relation with respect to each other are upstanding studs 41 which cooperate in a manner hereinafter explained, with a holding lug 42 mounted in the plate 37 at an edge of the recess 40 (as best shown in Figs. 1 and 4). A portion of this holding lug 42 extends above the top surface of the plate 37 and has one end portion provided with a concavity 43 corresponding in the present instance to the transverse curvature 44 of the felly 45 of the wheel 46.

The pressure plate 27 carries an upstanding bearing 47 having a horizontal passage 48 formed therein. Projected through this passage 48 is a guide rod 49. One end 50 of this guide rod 49 is connected to the frame 11 as at 12'. The opposite end 51 of the guide rod is connected to the front plate 52 of the cylinder 13 by means of a bracket 53 connected to the end 51 of the guide rod 49 as at 54.

In Fig. 8 we have illustrated a typical wheel adapted to have a tire mounted thereon by a machine constructed in accordance with the description herein. In this connection the wheel 46, in addition to comprising the rim or felly 45, comprises a hub structure 55 from which extend the spokes 56 to the felly 45 to which they are connected. The recess 40 formed in the supporting plate 37 is adapted to accommodate the larger side 55' of this hub, as shown in dotted lines, Figs. 1 and 3.

This wheel, in order to have a tire mounted thereon, is placed upon the supporting plate 37 with the enlarged hub confined in the recess 40. In this position of the wheel 46, two of its spokes will bear against the studs 41 and a portion 41' of the felly will bear against the convexity 43 of the lug 42. Hence, the wheel will be removably held against movement horizontally during the tire mounting operation, which is accomplished in the following manner:

A tire 57 is mounted so that a portion will fit into the felly 45 opposite the lug 42. This will dispose the opposite portion of the tire 57 upon the edge of the felly as shown in dotted lines at 58. The operator then opens the valve 20 and simultaneously operates the valve 17 to admit air under pressure through the conduit 16 into the cylinder 13. This compressed air will force the piston forwardly and consequently move the pressure plate and the elevators 30 simultaneously toward the mounting plate 37. In their initial movement of the elevators 30, as shown in Fig. 3, the cam surfaces 35 thereof will have pivoted the mounting plate 37 to a substantially horizontal position with the pressure plate 27 in contact with a substantial portion of the tire. This permits the wheel to be elevated in a horizontal position prior to the final stroke of the pressure plate 27, thus clamping and holding the wheel and tire between the mounting plate and the pressure plate. In the final stroke of the plate 27 said opposite portion of the tire 57 is frictionally engaged by the forward portion of the pressure plate 27 and forced over and onto the felly 45 of the wheel 46, thus completing the tire mounting operation.

While holding the valve 20 open, the operator manipulates the valve handle 18 in a direction to discontinue the compressed air through the conduit 16 and to allow the passage of the compressed air through the conduit 15, whereby to move the piston in an opposite direction and thereby to retract the elevating plates 30 and pressure plate 27 to their initial inoperative position.

From this description, it is manifest that we have provided a device for effectively mounting tires upon the felly of a wheel by a machine pneumatically operated through a pneumatic system requiring for the operation of the machine the employment of both hands of the operator.

A machine constructed in accordance with the description herein is most effective for mounting tires upon the felly of a wheel.

Once an operator has been trained to operate the machine, he or she may mount tires upon the fellies of wheels in rapid succession, thereby resulting in substantially maximum production of completed tire-mounted wheels.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having thus described our invention, what we claim as new and desire to protect by Letters Patent is:

1. In combination, a tire machine comprising a base plate, a mounting plate above the base plate, means for pivotally connecting the mounting plate at one end thereof to the base plate for pivotal vertical movement with respect to the base plate, a pressure plate spaced above the mounting plate and movable transversely thereof and there-over, means supporting the pressure plate for said movement, means for supporting a wheel upon said mounting plate and on which wheel a tire is to be placed on the felly thereof, and means movable in a horizontal plane, and having means engageable with the under side of the free end of said mounting plate to pivot said free end of said mounting plate to pivot said mounting plate vertically with respect to the base plate for elevating said mounting plate in a position to clamp said wheel and said tire between said mounting plate and said pressure plate and to hold said wheel and said tire on said mounting plate during operation of the pressure plate on the tire, the pressure plate being movable in a horizontal plane in fixed relation with respect to the movement of the elevating means.

2. In combination, a tire machine comprising a base plate, a mounting plate above the base plate, means for pivotally connecting the mounting plate at one end thereof to the base plate for pivotal vertical movement with respect to the base plate, a pressure plate spaced above the mounting plate and movable transversely thereof and there-over, means supporting the pressure plate for said movement, means for supporting a wheel upon said mounting plate and on which wheel a tire is to be placed on the felly thereof, and means movable in a horizontal plane, and having means engageable with the under side of the free end of said mounting plate to pivot said mounting plate vertically with respect to the base plate for elevating said mounting plate in a position to clamp said wheel and said tire between said mounting plate and said pressure plate and to hold said wheel and said tire on said mounting plate during operation of the pressure plate on the tire, the pressure plate being movable in a horizontal plane in fixed relation with respect to the movement of the elevating means, and means for connecting said elevating means and said pressure plate together for simultaneous operation.

3. In combination, a tire machine comprising a base plate, a mounting plate above the base plate, means for pivotally connecting the mounting plate at one end thereof to the base plate for pivotal vertical movement with respect to the base plate, a pressure plate spaced above the mounting plate and movable transversely thereof and there-over, means supporting the pressure plate for said movement, means for supporting a wheel upon said mounting plate and on which wheel a tire is to be placed on the felly thereof, and means movable in a horizontal plane, and having means engageable with the under side of the free end of said mounting plate to pivot said mounting plate vertically with respect to the base plate for elevating said mounting plate in a position to clamp said wheel and said tire between said mounting plate and said pressure plate and to hold said wheel and said tire on said mounting plate during operation of the pressure plate on the tire, the pressure plate being movable in a horizontal plane, in fixed relation with respect to the movement of the elevating means, said elevating means including members having cam edges engaging the free edge of said mounting plate.

4. In combination, a tire machine comprising a base plate, a mounting plate above the base plate, means for pivotally connecting the mounting plate at one end thereof to the base plate for pivotal vertical movement with respect to the base plate, a pressure plate spaced above the mounting plate and movable transversely thereof and there-over, means supporting the pressure plate for said movement, means for supporting a wheel upon said mounting plate and on which wheel a tire is to be placed on the felly thereof, and means movable in a horizontal plane, and having means engageable with the under side of the free end of said mounting plate to pivot said mounting plate vertically with respect to the base plate for elevating said mounting plate in a position to clamp said wheel and said tire between said mounting plate and said pressure plate and to hold said wheel and said tire on said mounting plate during operation of the pressure plate on the tire, the pressure plate being movable in a horizontal plane in fixed relation with respect to the movement of the elevating means, and means for connecting said elevating means and said pressure plate together for simultaneous operation, said elevating means including members having cam edges engageable with the free edge of said mounting plate.

SAMUEL KROLL.
NATHAN J. KROLL.

REFERENCES CITED

The following references are of record in the file of this patent:

UNITED STATES PATENTS

| Number | Name | Date |
|---|---|---|
| 798,974 | Poole | Sept. 5, 1905 |
| 805,792 | Hadden | Nov. 28, 1905 |
| 1,228,745 | Cartier | June 5, 1917 |
| 1,615,469 | McKenzie | Jan. 25, 1927 |
| 1,822,501 | Onsrud | Sept. 8, 1931 |
| 2,034,819 | Maulis | Mar. 24, 1936 |
| 2,228,086 | Rodgers | Jan. 7, 1941 |

FOREIGN PATENTS

| Number | Country | Date |
|---|---|---|
| 248,107 | Great Britain | Mar. 4, 1926 |